United States Patent [19]

Brown

[11] 4,151,702
[45] May 1, 1979

[54] MOWER GRASS CATCHER FOR REAR DISCHARGE

[75] Inventor: Thomas E. Brown, Mechanicsburg, Pa.

[73] Assignee: The Perfection Manufacturing Company, St. Louis, Mo.

[21] Appl. No.: 817,716

[22] Filed: Jul. 21, 1977

[51] Int. Cl.² ............................................. A01D 35/22
[52] U.S. Cl. ....................................... 56/203; 56/16.6
[58] Field of Search .......................... 56/16.6, 194-206

[56] References Cited

U.S. PATENT DOCUMENTS

| 2,955,404 | 10/1960 | Strasel et al. | 56/202 |
| 3,134,214 | 5/1964 | Shaw | 56/202 |
| 3,668,846 | 6/1972 | Knight | 56/205 |
| 3,722,192 | 3/1973 | Corbett | 56/202 |

Primary Examiner—Russell R. Kinsey
Attorney, Agent, or Firm—Cohn, Powell & Hind

[57] ABSTRACT

A grass catcher having a lid with downturned side flanges, and a transverse web seating on a pair of rearwardly extending handle members. An interconnecting member on the side walls of a container selectively engages guide members on the side flanges of the lid for detachably connecting the container to the lid. The guide members are upwardly facing surfaces and provide rearwardly opening tracks. The interconnecting members are laterally extending flanges received in the tracks and seating on the upwardly facing surfaces. A pair of bottom opening, longitudinal channels in the lid web receive the handle members for holding the lid on the handle members before, during and after attachment of the container to the lid. A bail is pivotally mounted to the side walls at the front of the container, the bail having a portion seating on the laterally extending container flanges in its folded position and being received in the guide tracks of the lid when the container is attached. The bail supports and holds a hinged cover plate for the rear discharge opening of the mower in its open position when the container is attached to the lid, the cover plate disengaging from the bail to close the rear discharge opening when the container is detached from the lid.

11 Claims, 7 Drawing Figures

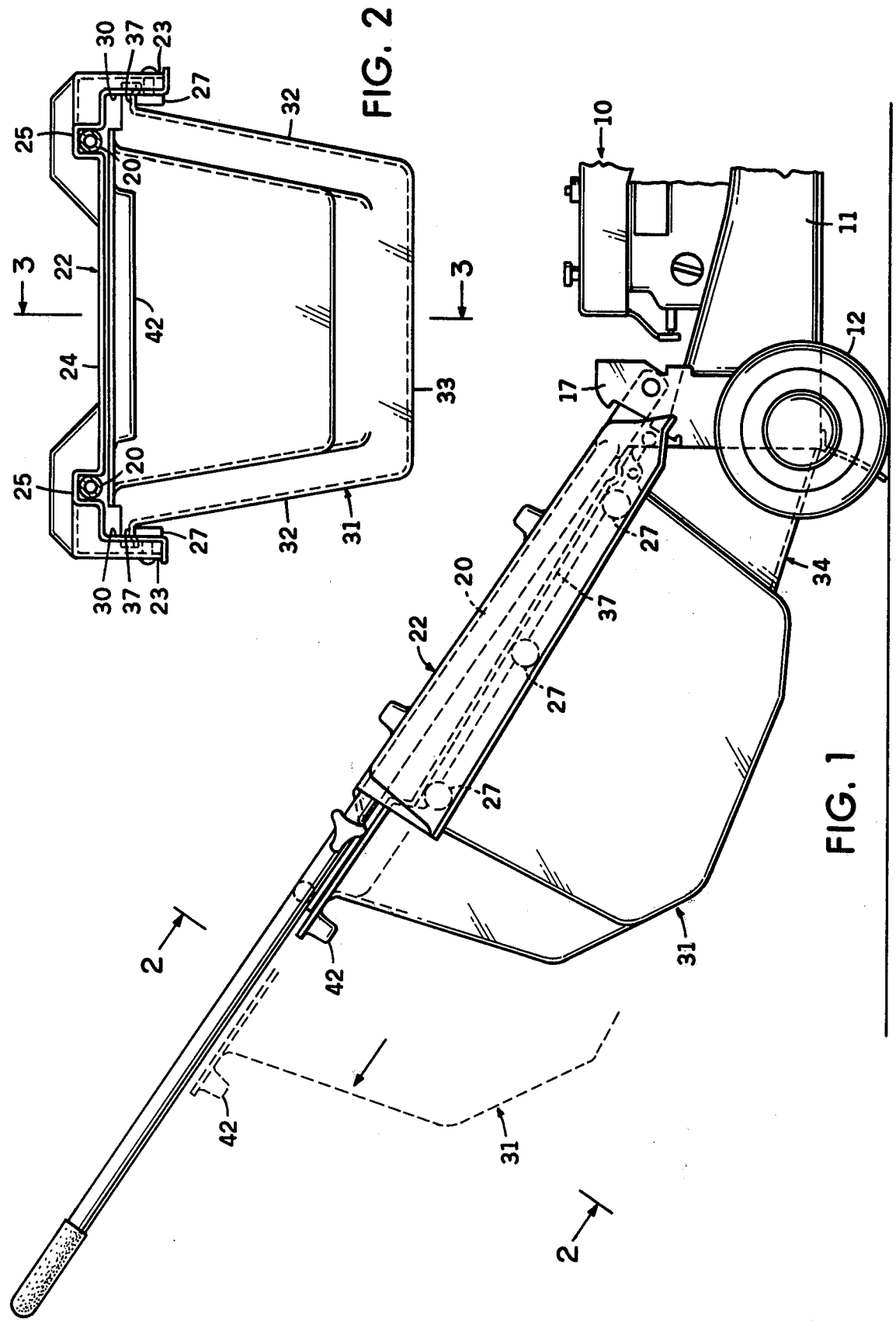

MOWER GRASS CATCHER FOR REAR DISCHARGE

BACKGROUND OF THE INVENTION

This invention relates generally to improvements in a grass catcher, and more particularly to an improved rigid, grass catcher for a rear discharge mower.

With the heretofore conventional rigid, grass catchers for rear discharge mowers, the catcher had to be completely removed from the mower in order to be emptied and then had to be completely replaced as a unit. In those grass catchers having separable lids, the lid stayed on the container as the catcher was removed and had to be replaced on the container before attachment of the catcher to the mower. This type of assembly requires the user to handle both the lid and container.

SUMMARY OF THE INVENTION

With the present grass catcher the lid is retained on the mower handles, thereby requiring only the container to be removed. The interconnection between the lid and the container enables quick and easy removal and replacement of the container. Only the container is handled by the user, not the lid.

The grass catcher includes a lid having downturned side flanges and a transverse web adapted to seat on rearwardly extending handle members of the lawn mower. Interconnecting means are provided on side walls of a container which selectively engage with guide means on the lid side flanges for detachably connecting the container to the lid.

The guide means consists of upwardly facing surfaces, as is provided by a plurality of rollers, on the inside of the lid flanges, the upwardly facing surfaces being spaced from the lid web to provide rearwardly opening tracks. The interconnecting means are laterally extending flanges on the container side walls which are selectively received in the guide track and seat on the upwardly facing surfaces.

A positioning means on the lid engages the handle members for holding the lid on the handle members before, during and after attachment of the container to the lid. More particularly, the positioning means is a pair of downwardly open, longitudinal channels in the lid web for receiving the handle members.

Pivotally mounted on the side walls at the front of the container, is a bail. The bail includes a portion engageable with and seating on the interconnecting means in the folded position of the bail. This bail portion is engageable with and seats on laterally extending container flanges in the folded position of the bail, and is received in the guide tracks of the lid when the container is attached.

The mower includes a hinged cover plate for the rear discharge opening which selectively opens and closes the opening. When the container is attached to the lid the cover plate seats on the bail and the rear discharge opening is open. When the container is detached from the lid, the bail disengages from the cover plate, thereby allowing the cover plate to close the rear discharge opening.

BRIEF DESCRIPTION OF THE DRAWINGS

FIG. 1 is a side elevational veiw of the grass catcher and mower, the phantom lines indicating the position assumed by the container during attachment and detachment of the containeur to the lid;

FIG. 2 is a cross sectional view as taken on line 2—2 of FIG. 1;

Figure 3:
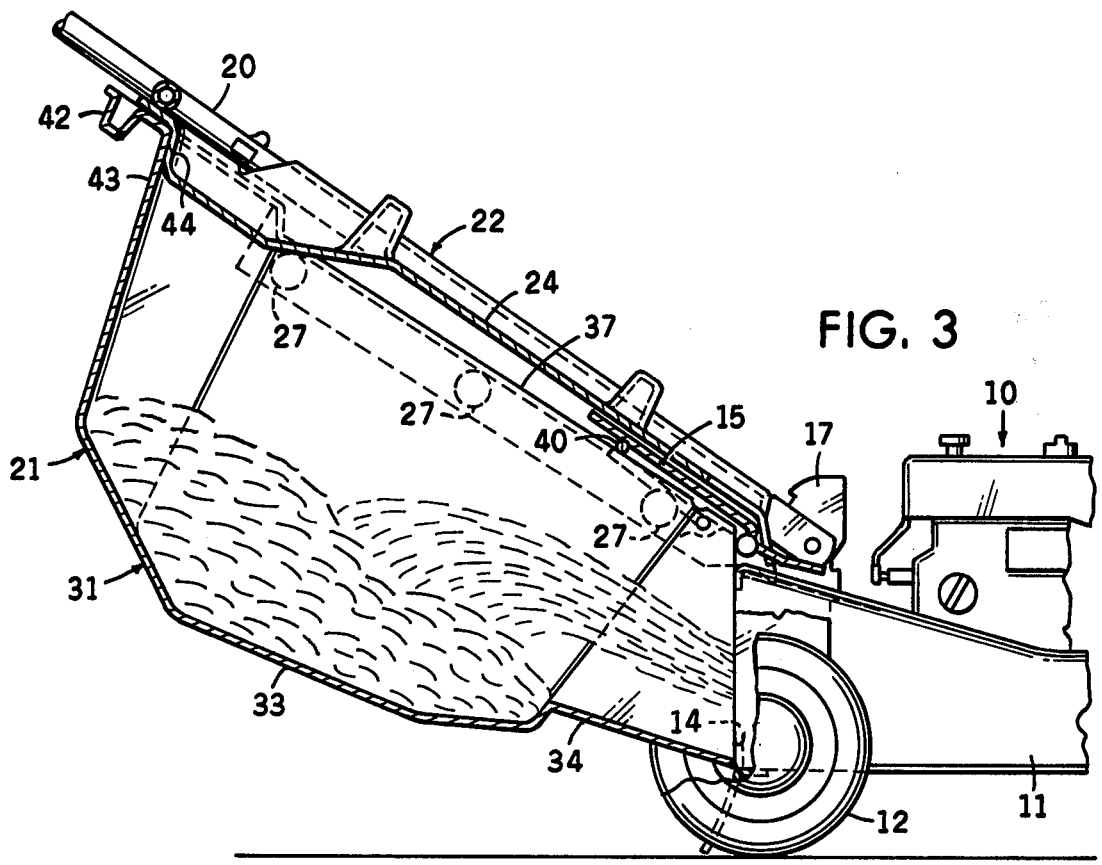
FIG. 3 is a cross sectional view of the grass catcher as assembled on the mower, as taken on line 3—3 of FIG. 2.

DESCRIPTION OF THE PREFERRED EMBODIMENT:

Referring by characters of reference to the drawing, and first to FIG. 1, it will be understood that the lawn mower indicted by 10 includes a deck housing 11 mounted on a pair of rear wheels 12. The housing 11 includes a rear wall 13 (FIG. 5) which is provided with a rear discharge opening 14 (FIGS. 3 and 4).

Figure 5:
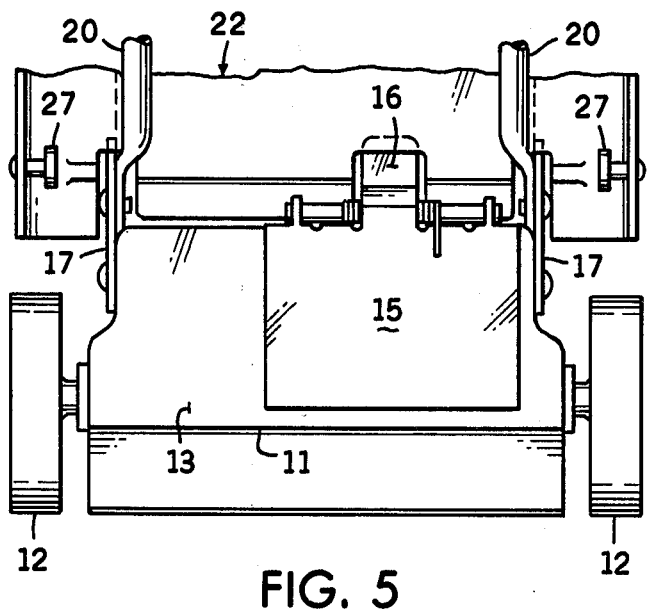
FIG. 5 is a fragmentary, rear elevational view as seen from the left of FIG. 4.
Figure 4:
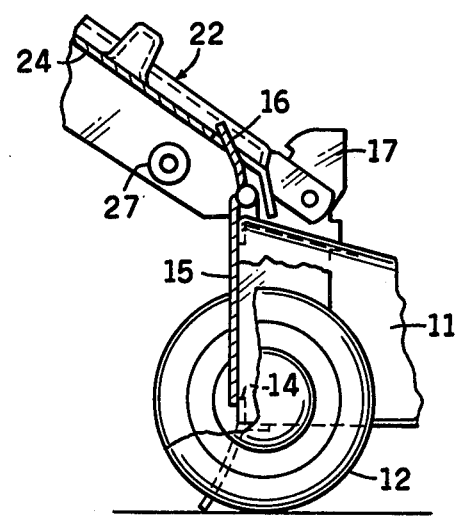
FIG. 4 is a fragmentary cross sectional view longitudinally of the lid and mower, illustrating the association of the lid, handle members, rear discharge opening and cover plate.
Figure 6:
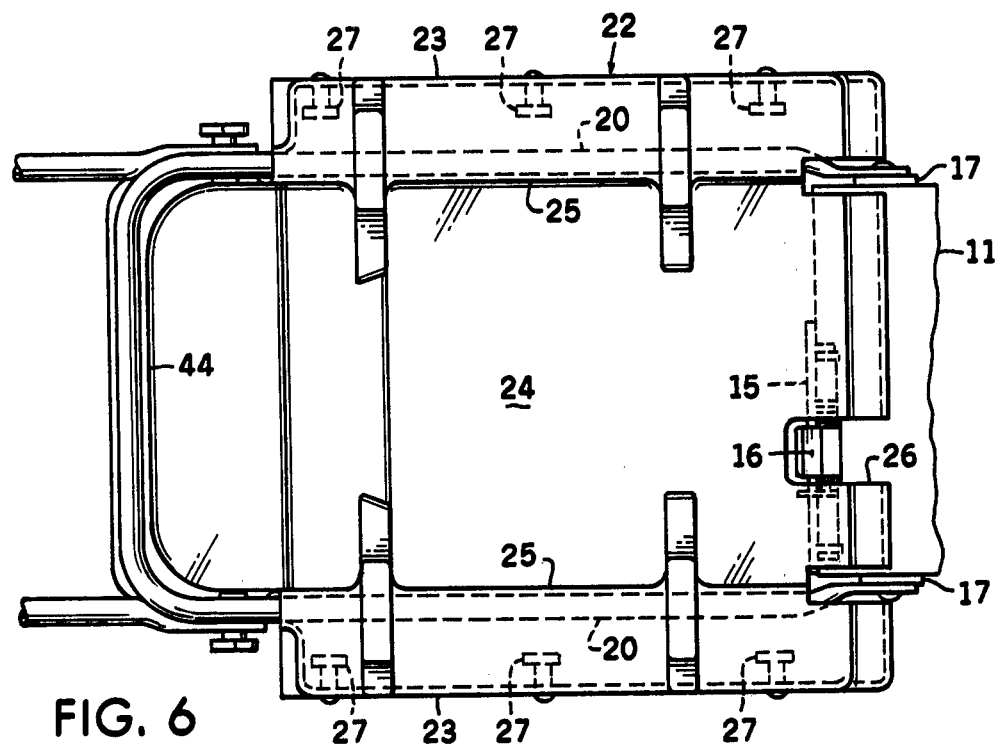
FIG. 6 is a fragmentary, top plan view of the grass catcher shown in FIG. 1.

Hingedly mounted to the top rear of the deck housing 11 is a cover plate 15 adapted to close the rear discharge opening 14 in one position as is illustrated in FIGS. 4 and 5. Formed integrally with the cover plate 15 and extending upwardly above the hinge connection, is a tap 16 that can be easily gripped in order that one may raise the cover plate 15 and open the rear discharge opening 14.

Pivotally connected to a pair of laterally spaced brackets 17 attached to the rear top of the mower housing 11, are a pair of rearwardly extending handle members 20.

A rigid, rear discharge grass catcher indicated by 21 is carried by the handle members 20 at the rear of the mower housing 11. The grass catcher 21 includes a lid 22 having opposed, downturned side flanges 23 interconnected by a transverse web 24 adapted to seat on handle members 20. The lid 22 includes a positioning means for engaging the handle members 20 for holding the lid 22 on the handle members 20. This positioning means includes a pair of downwardly open, longitudinal channels 25 in thelid web 24 that are adapted to receive the handle members 20.

The front margin of lid web 24 is provided with a slot 26 through which the cover plate tab 16 can project for access in order that one may selectively raise the cover plate 15 when the lid 22 is seated on the handle members 20.

Guide means are provided on the side flanges 23 of the lid 22, the guide means including upwardly facing surfaces as provided by a plurality of longitudinally spaced rollers 27 mounted on the inside of the lid side flanges 23. The rollers 27 are spaced below the lid web 24 to define therewith guide tracks that open rearwardly of the lid 22.

Figure 7:
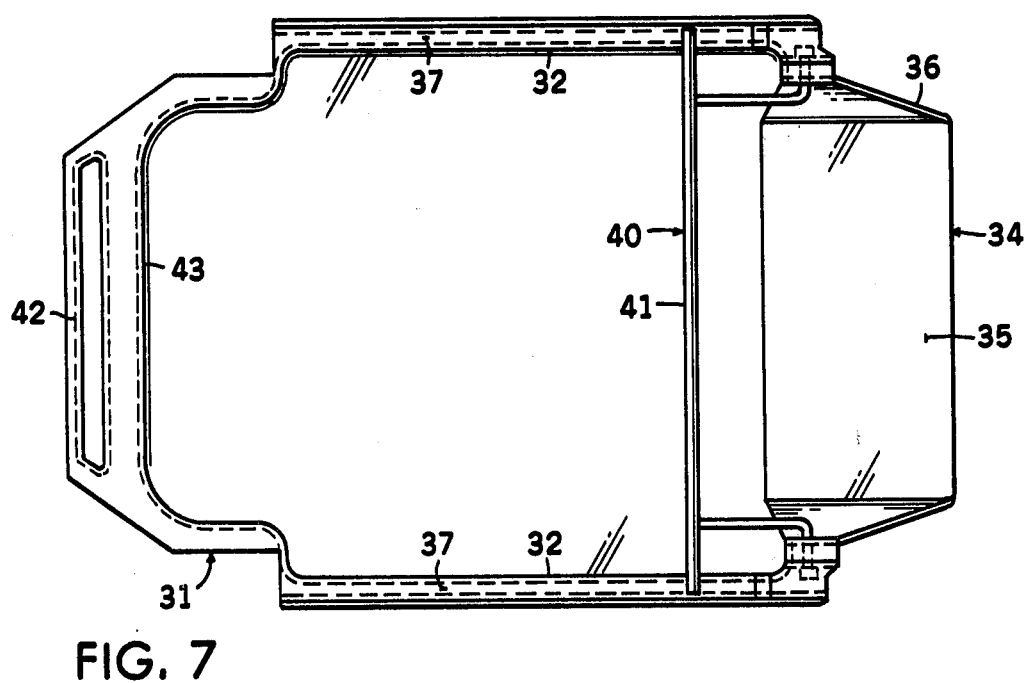
FIG. 7 is a top plan view or the removable container.

The grass catcher 21 includes a container referred to by 31 having opposed side walls 32 and an interconnecting transverse bottom wall 33. As is best shown in FIG. 7, the container 31 includes a chute 34 at its front end having a bottom wall 35 and side walls 36 that embrace the bottom and sides of the rear discharge opening 14 of the mower housing 11 when the container 31 is operatively attached to the lid 22.

The side walls 32 of the container 31 are provided with laterally extending flanges 37, constituting interconnecting means, which are received selectively in the guide tracks 30 of the lid 22 and seat on the rollers 27 when the container 31 is attached to the lid 22.

Pivotally connected to the side walls 32 at the front of the container 31, is a bail indicated by 40. The bail 40 includes a bight portion 41 engageable with and seating on the laterally extending flanges 37 of the container 31 in the folded position of the bail 40. When the container 31 is attached to the lid 22, the lateral extensions of the bight portion 41 of the bail 40 are received in the guide tracks 30 of the lid 22. When the container is detached, the bail 40 can be raised so that it can be utilized by the user to facilitate carrying and emptying of the container 31.

As the container 31 is attached to the lid 22, the bight portion 41 of bail 40 is seated on the container flanges 37 in its folded position. Before the container 31 is fully attached as the container flanges 37 move longitudinally on the lid rollers 27, the cover plate 15 is raised to a position above the bight portion 41 of the bail and is held in the raised position until the container 31 is moved forwardly a sufficient distance so that the bight portion 41 underlies and supports the cover plate 15. Therefore, when the container 31 is operatively attached to the lid 22, the rear discharge opening 14 of the mower housing 11 opens into the container chute 34 so that grass cuttings can move directly through the rear discharge opening 14 and into the container 31.

It is thought that the functional advantages of the grass catcher have become fully apparent from the foregoing detailed description of parts, but for completeness of disclosure, the assembly and usage of the catcher will be briefly described.

To assemble the catcher 21 to the mower, the lid 22 is placed on top of the handle members 20, and more particularly with the handle members 20 located in the downwardly open lid channels 25. In this position, the front slot 26 of the lid 22 receives the cover plate tab 16, and the lid side flanges 23 are located outwardly of the handle members 20.

The container 31 is lifted by the bail 40 at the front end and by the hand grip 42 at the rear end, and is then raised to a position below the handle members 20 immediately behind the lid 22 with the container flanges 37 aligned with the rearwardly opening guide tracks 30. The container 31 is moved forwardly into the lid 22 with the container flanges 37 moving into the guide tracks 30 and on top of the rollers 27. Before the container 31 is completely slidably assembled to the lid 22, the user grips the cover plate tab 16 and raises the cover plate 15 up against the lid web portion 24 so that it is above the bight portion 41 of the bail 40. While the cover plate 15 is held in this raised position, the container 31 is moved forwardly until the bail bight portion 41 moves under the cover plate 15 and thereby holds the cover plate 15 in the raised position. Then the container 31 is moved completely forward until the rear wall 43 of the container 31 engages the rear flange 44 of lid 22. The lid 22 and container 31 are now completely attached and the container 31 is positioned with the chute 35 embracing the rear discharge opening 14 of the mower housing 11.

When the container 31 is filled with grass clippings and it is desirable to empty the catcher, the container 31 is simply moved rearwardly relative to the lid 22 while the lid 22 remains seated on the handle members 20. The container flanges 37 move easily out of the guide tracks 30 on the rollers 27. As the bail bight portion 41 moves out from under the cover plate 15, the spring-loaded cover plate 15 will fall to its closed position relative to the rear discharge opening 14 thereby precluding any material being thrown out of such opening 14 and into the container 31 as the container 31 is finally separated from the lid 22. Moreover, the closed cover plate 15 will preclude objects from being thrown through the rear discharge opening 14 when the container 31 is completely detached.

It will be understood that when the container 31 is completely detached from the lid 22, the lid 22 remains in its seated position on the handle members 20 ready for reinsertion of and reconnection with the container 31.

I claim as my invention:

1. A grass catcher for a lawn mower having a pair of rearwardly extending handle members, comprising:
   (a) a lid including:
      (1) downturned side flanges, and
      (2) a transverse web adapted to seat on the handle members,
   (b) guide means on the side flanges of the lid,
   (c) a container including opposed side walls and a transverse bottom wall, and
   (d) interconnecting means on the side walls of the container selectively engageable with the guide means for detachably connecting the container to the lid.

2. A grass catcher as defined in claim 1, in which:
   (e) the guide means includes rearwardly opening guide tracks having upwardly facing surfaces, and
   (f) the interconnecting means includes laterally extending flanges on the container side walls received in the guide tracks and seating on the upwardly facing surfaces.

3. A grass catcher as defined in claim 1, in which:
   (e) the guide means includes a plurality of rollers mounted on the inside of the lid side flanges in longitudinally spaced relation, the rollers being spaced from the lid web to provide rearwardly opening guide tracks therebetween, and
   (f) the interconnecting means are laterally extending flanges on the container side walls selectively received in the guide tracks and seating on the rollers.

4. A grass catcher as defined in claim 1, in which:
   (e) positioning means on the lid engages the handle members for holding the lid on the handle members before, during and after attachment of the container to the lid.

5. A grass catcher as defined in claim 4, in which:
   (f) the positioning means is a pair of downwardly open, longitudinal channels in the lid web for receiving the handle members.

6. A grass catcher as defined in claim 1, in which:
   (e) a bail is pivotally connected to the side walls at the front of the container, the bail including a portion engageable with and seating on the interconnecting means in the folded position of the bail.

7. A grass catcher as defined in claim 2, in which:
   (g) a bail has ends pivotally connected to the side walls at the front of the container, and has a portion engageable with and seating on the laterally extending flanges of the container in the folded position of the bail, said bail portion being received in the guide tracks of the lid when the container is attached to the lid.

8. In a lawn mower assembly:

(a) a mower including:
- (1) a rear discharge opening, and
- (2) a pair of rearwardly extendng, laterally spaced handle members, (b) a grass catacher including:
- (1) a lid having downturned side flanges, and
- (2) a transverse web provided with downwardly open, laterally spaced channels receiving the handle members and holding the lid thereon, (c) guide means on the side flanges of the lid including rear opening tracks, (d) a container including side walls, a transverse bottom wall, and a front opening, and (e) interconnecting means on the side walls of the container selectively interfitting the rear opening tracks and engaging the guide means for detachably connecting the container to the lid, and for aligning the container front opening with the mower discharge opening, the container being selectively disconnected from the lid while the lid remains on the handle members by removing the interconnecting means from the guide means through the rear opening tracks.

9. In a lawn mower assembly as defined in claim 8, in which:

(f) the guide means includes upwardly facing surfaces on the inside of the lid side flanges and spaced from the lid web, and (g) the interconnecting means includes laterally extending flanges on the container side walls received in the guide tracks and seating on the upwardly facing surfaces of the lid side flanges.

10. In a lawn mower assembly as defined in claim 9, in which:

a hinged cover plate is provided which selectively opens and closes the rear discharge opening, the cover plate being held in the open position by the container when the container is attached to the lid.

11. In a lawn mower assembly as defined in claim 10, in which:

(h) a bail has ends pivotally connected to the side walls at the front of the container, and has a web engageable with and seating on the laterally extending flanges of the container in the folded condition of the bail, the said bail portion being received in the guide track of the lid when the container is attached, and (i) the cover plate seats on the bail when the container is attached to the lid to hold the cover plate in the open position, and disengages from the bail to close the rear discharge opening when the container is detached from the lid.

* * * * *

UNITED STATES PATENT AND TRADEMARK OFFICE
CERTIFICATE OF CORRECTION

PATENT NO. : 4,151,702
DATED : May 1, 1979
INVENTOR(S) : THOMAS E. BROWN

It is certified that error appears in the above-identified patent and that said Letters Patent are hereby corrected as shown below:

Claim 10:

Column 6, line 10, before "a" insert --(h)--.

Signed and Sealed this

Twenty-first Day of August 1979

[SEAL]

Attest:

LUTRELLE F. PARKER

*Attesting Officer*   *Acting Commissioner of Patents and Trademarks*